United States Patent [19]

Lipke

[11] 4,156,210
[45] May 22, 1979

[54] RESONANT TRANSFORMER PUSH-PULL TRANSISTOR OSCILLATOR

[75] Inventor: Donald L. Lipke, Garland, Tex.

[73] Assignee: Biometrics Instrument Corp., a division of Varo, Inc., Garland, Tex.

[21] Appl. No.: 888,189

[22] Filed: Mar. 20, 1978

Related U.S. Application Data

[62] Division of Ser. No. 736,958, Oct. 29, 1976, abandoned.

[51] Int. Cl.$^2$ ............................................. H03B 5/12
[52] U.S. Cl. ............................... 331/114; 331/108 D; 331/117 R
[58] Field of Search ................ 331/117 R, 114, 113 A, 331/168, 108 D

[56] References Cited

U.S. PATENT DOCUMENTS

| | | | |
|---|---|---|---|
| 3,255,402 | 6/1966 | Vollnhals | 323/4 X |
| 3,299,371 | 1/1967 | Ryan | 331/117 X |
| 3,480,872 | 11/1969 | Breuer | 330/256 |
| 3,629,692 | 12/1971 | Goyer | 323/4 |
| 3,763,444 | 10/1973 | Tavis | 331/114 X |
| 3,893,017 | 7/1975 | Williams | 323/4 |
| 3,895,286 | 7/1975 | Steckler | 323/4 |
| 3,925,718 | 12/1975 | Wittlinger | 323/4 |
| 4,030,023 | 6/1977 | Keith | 323/4 |
| 4,055,811 | 10/1977 | Wheatley, Jr. | 323/4 X |

OTHER PUBLICATIONS

Anzani, "Current Generator Made With Four Parts," Electronic Design, vol. 16, No. 3, Feb. 1, 1968, p. 134.

Primary Examiner—Siegfried H. Grimm
Attorney, Agent, or Firm—Richards, Harris & Medlock

[57] ABSTRACT

The specification discloses a regulated temperature compensated current source in combination with a self resonant oscillator. The current source receives an unregulated DC voltage and compensates the DC voltage with a negative current coefficient. A current source circuit receives the compensated DC voltage in order to generate a regulated current. The current source circuitry has a positive temperature coefficient to thereby provide temperature compensation to the generated current. The oscillator includes a resonant transformer connected at the ends thereof to first and second transistors. A pair of voltage detectors are also connected across the ends of the transformer for receiving drive current and for rendering alternate ones of the transistors conductive in dependence upon which end of the transformer is at the highest potential. The oscillator thus operates in a self resonant mode to generate a very stable sinusoidal wave which is particularly adapted for application to a multiplier for generation of a stable DC output signal.

12 Claims, 3 Drawing Figures

RESONANT TRANSFORMER PUSH-PULL TRANSISTOR OSCILLATOR

This is a division of application Ser. No. 736,958, filed Oct. 29, 1976, and now abandoned.

FIELD OF THE INVENTION

This invention relates to oscillators, and more particularly relates to self resonant oscillators which incorporate a regulated temperature compensated current source.

THE PRIOR ART

Image intensifier tubes are commonly used in a number of different applications to sense and amplify low intensity radiation images. For example, image intensifier tubes are used in battlefield environments to detect dimly illuminated targets. Typically, such image intensifier tubes include a microchannel plate (MCP) comprised of a bundle of discrete hollow glass tubes or channels which are capable of amplifying an electron image by many orders of magnitude. The electron images are generated by a photocathode in response to incidence radiation images. The multiplied electron image from the microchannel plate is directed onto a phosphorous screen to provide an intensified display of the sensed radiation images.

In most military applications, image intensifier tube systems are required to be powered by a relatively low voltage DC battery source. Previously developed image intensifier tube systems have thus generally used oscillator circuits to provide high voltage AC power outputs which are applied to multiplier systems in order to generate desired DC output signals. The DC output signals are applied to drive the various stages of the image intensifier tubes, such as the screen, cathode, corrector, cone and the microchannel plate of the tube. The level of the DC driving voltages are critical, as even slight variations in the DC driving voltages may cause distortion in the displayed image on the image intensifier tube. Examples of such previously developed image intensifier tube systems are disclosed in U.S. Pat. Nos. 3,666,951; 3,739,178; 3,816,744 and 3,864,595. Another prior system is disclosed in U.S. Pat. No. 4,044,249 entitled "VOLTAGE SUPPLY INCLUDING BILATERAL ATTENUATOR", to Charles E. Moore, et al. and assigned to the present assignee, wherein a single oscillator may be used to derive constant DC voltages and to provide a variable DC voltage for application to the microchannel plate of an image intensifier tube.

Previously developed image intensifier tube driving systems have often incorporated oscillator circuits operating Class C. Such driving systems generally require a minimum of one capacitor and a power transistor which has a peak operating current approximately ten times the average DC input current. In circuits which permit stable control of the amplitude of oscillation by regulating a low current drive signal, two capacitors are usually required. Further, in applications where high peak input current impulses are objectionable, it is necessary to add an additional filter capacitor between the oscillator and its DC power source. Such previously developed circuits cannot maximize the potential advantage of integrated circuitry, because such capacitors must be added externally to the active component substrate of the integrated circuitry. Moreover, the required high peak current capabilities of such previously developed circuits are generally uncommon for integrated circuit transistors.

A need has thus arisen for an oscillator circuit which may be formed on integrated circuitry without the requirement of a large number of external discrete components. With the use of such an integrated circuitry oscillator, considerable space saving is effected, an important consideration when the image intensifier tube system is being incorporated into battlefield devices which must be carried by soldiers. Moreover, the ability to form a complete oscillator on integrated circuitry considerably reduces the manufacturing expense, while providing improved operation lifetime and maintenance characteristics.

SUMMARY OF THE INVENTION

In accordance with the present invention, a regulated temperature compensated current source includes circuitry for receiving an unregulated DC voltage. Temperature compensation circuitry is provided to compensate the DC voltage to vary with temperature variations according to a first temperature coefficient. Current source circuitry is connected to receive the compensated DC voltage, the circuitry having a second temperature coefficient with an opposite polarity to the first temperature coefficient, thereby providing a constant output current for a wide range of operating temperatures and supply voltages.

In accordance with a more specific aspect of the invention, a regulated temperature compensated current source includes a first transistor having a first resistance connected across the emitter and base terminals thereof. A second transistor has a base connected to the collector of the first transistor and has an emitter connected to the base of a first transistor. A terminal receives an unregulated DC voltage and applies the DC voltage to the emitter of the first transistor. The first transistor conducts when the voltage across the first resistance exceeds the base-emitter voltage of the first transistor in order to regulate the base drive current to the second transistor. The regulated drive current has a negative temperature coefficient. A diode is coupled to the collector of the second transistor to provide a low impedance voltage source. A current source comprising a transistor and emitter resistor is connected to the diode to generate a regulated current output at the collector of the transistor, the current source having a positive temperature coefficient for constant current in the diode. The combined effect of varying operating temperature on the output current is thereby reduced or eliminated entirely.

A further aspect of the invention is that multiple temperature stabilized current outputs are effected by adding additional transistors and separate emitter resistors for each in parallel with the diode voltage source.

In accordance with another aspect of the invention, an oscillator is provided which includes a resonant transformer. A pair of power transistors are connected in a push-pull configuration across the transformer. Circuitry is provided to apply current to the power transistors. At least one voltage control switch alternately directs current from the circuitry to one of the power transistors which is connected to the end of the transformer having a predetermined polarity.

In accordance with another aspect of the invention, an oscillator comprises a resonant transformer having a center tap. First and second transistors are each connected between an end of the transformer and circuit ground and each includes a control electrode. First and second voltage detectors are connected across the ends of the transformer and each circuit has a first terminal for receiving drive current and a second terminal for connection to a control electrode of one of the first and second transistors. The voltage detectors are operable to render one of the first and second transistors conductive in dependence upon which end of the transformer is at the highest potential. The oscillator thus oscillates to generate a predetermined frequency signal at the transformer.

In accordance with yet another aspect of the invention, an oscillator for fabrication on an integrated circuit chip includes a resonant transformer having a center tap. Circuitry applies voltage to the center tap. Four transistors are connected to form two transistor pairs, the bases of the transistor pairs being commonly connected to receive regulated current drive. First electrodes of each transistor pair are commonly connected to opposite ends of the transformer. Fifth and sixth transistors are connected in a push-pull configuration between the ends of the transformer and circuit ground. A second electrode of one transistor from each transistor pair is connected to the control electrode of one of the fifth and sixth transistors. Transistor pairs are operable to render alternate ones of the fifth and sixth transistors conductive in dependence upon which end of the transformer is at the highest potential.

DESCRIPTION OF THE DRAWINGS

For a more complete understanding of the present invention, and for further objects and advantages thereof, reference is now made to the following drawings taken in conjunction with the following description.

DESCRIPTION OF THE PREFERRED EMBODIMENT

Figure 1:
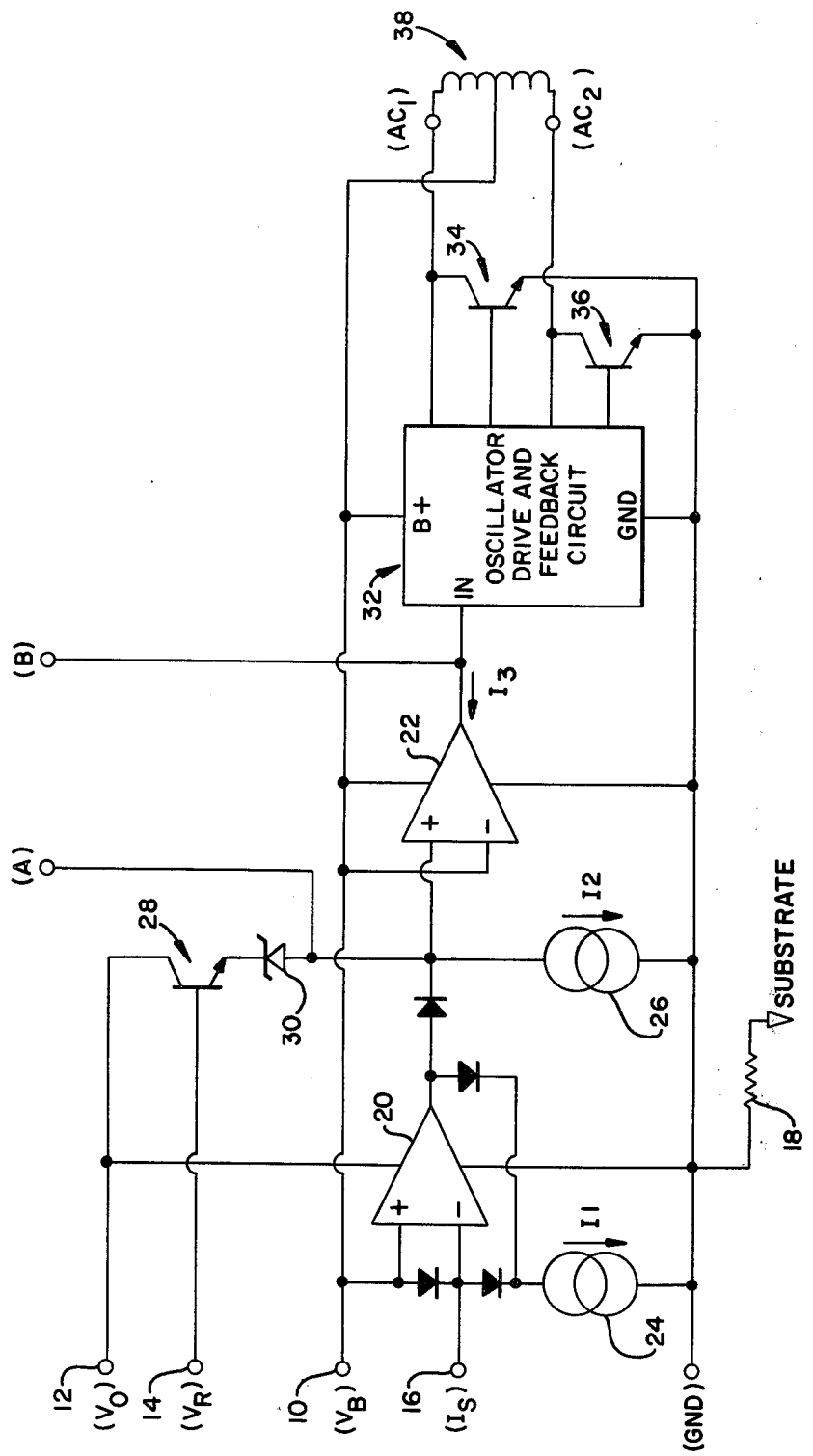
FIG. 1 is a combined schematic and block diagram of the current drive and oscillator of the invention.

Referring to FIG. 1, the present circuit comprising a regulated current source and a resonant oscillator is illustrated. An important aspect of the present invention is that the entire circuit thus illustrated may be formed on an integrated circuit chip, with few, and in some cases none, exterior discrete components required other than an external transformer. For example, the illustrated circuit of the present invention may be formed by interconnecting various interconnects on a Monochip A device, manufactured and sold by Interdesign, Inc., 1255 Reamwood Avenue, Sunnyvale, Calif. The incorporation of the entire circuit in an integrated chip package thus enables the present alternating current source to be incorporated in a miniaturized package for use in wafer tube power supplies for handheld weapon sights and the like.

The positive DC terminal of a small battery is applied to terminal 10, termed terminal $V_B$, to provide bias for the circuitry. A second positive voltage is applied to terminal 12, termed $V_O$, the voltage being developed from another portion of the circuitry, such as from another winding of the transformer, not shown. A direct proportion of the voltage at terminal $V_O$ is applied from an external voltage device, not shown, to the $V_R$ terminal 14. Automatic brightness control regulation of the MCP voltage is accomplished in the known manner by supplying terminal 16, termed $I_S$, with a current equal to the difference between a reference current and the actual screen current. The circuitry is internally connected to the substrate of the integrated circuit chip via a resistance 18.

The present circuit includes an operational amplifier 20 which is biased by voltage applied to terminal $V_B$ and which receives the automatic brightness control regulation voltage via terminal $I_S$. The output of the amplifier 20 is provided as an input to an operational amplifier 22. A first current source 24 is connected across the input of the operational amplifier 20, along with associated diodes, while a second current source 26 is connected across the input of the operational amplifier 22. As will be subsequently described in greater detail, the current sources are temperature compensated, in conjunction with associated circuitry, in order to provide a regulated temperature compensated current output for use with the circuitry.

A transistor 28 receives voltage applied to terminal $V_O$ at its collector and voltage applied to terminal $V_R$ at its base to provide an emitter follower connection. Voltage regulation of the oscillator is accomplished by feeding a direct proportion of the voltage $V_O$ from an external voltage divider to the $V_R$ terminal. The voltage is delivered through the emitter follower transistor 28 and a Zener diode 30 to a non-inverting input of the operational amplifier 22. The differential input to amplifier 22 is the difference between the voltage developed from terminal $V_B$ to terminal $V_R$ and the internal reference voltage across diode 30, plus the base-emitter junction of transistor 28.

If desired, an external capacitor may be attached to point B in order to provide feedback to provide control gain to stabilize the overall circuit to prevent unwanted oscillation. An external resistance may also be connected between terminal A shown in FIG. 1 and terminal $I_S$. This resistance sets the current to voltage gain of the feedback applied to terminal $I_S$, although it will be understood that the resistance is not always needed for operation of the circuitry.

The output of the operational amplifier 22 is connected to the input of the oscillator drive and feedback circuit 32 of the invention. As will be subsequently described, circuit 32, in coordination with transistors 34 and 36, is connected with a center tapped transformer winding 38 in order to generate a predetermined frequency signal. The present drive current source and oscillator circuitry thus provide a very stable alternating current signal in response to a low voltage battery supply.

Figure 2:
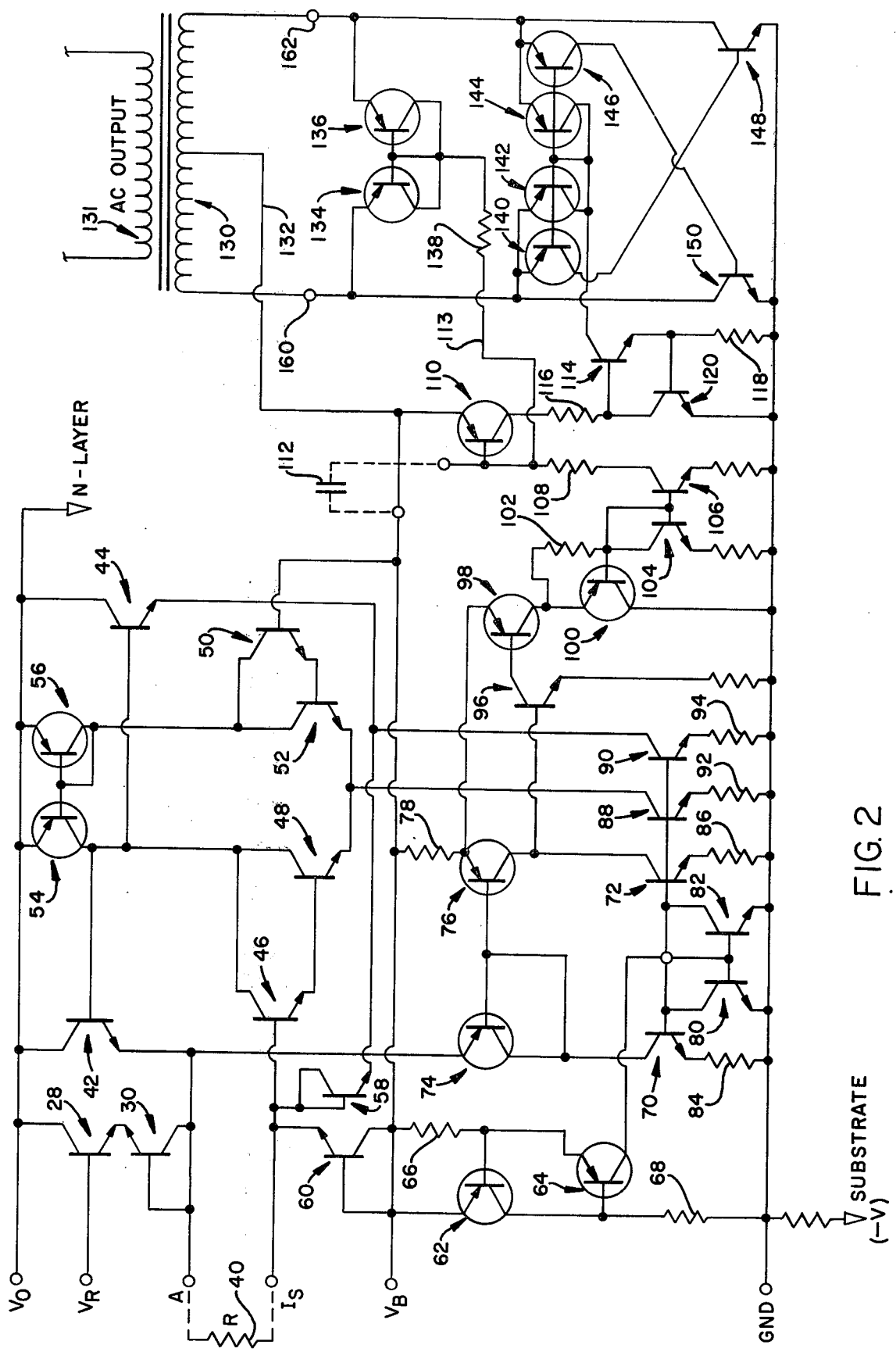
FIG. 2 is a complete schematic diagram of the preferred embodiment of the circuit shown in FIG. 1.

FIG. 2 illustrates the circuitry as shown in FIG. 1 in schematic detail for implementation in an integrated circuit configuration. Voltage is applied at terminal $V_R$ and is applied to the input of the emitter follower transistor 28 as previously described. The emitter of transistor 28 is connected to a transistor interconnected as a Zener diode 30. The terminals of the diode 30 are connected to point A which may be connected to an exterior resistance 40 which is connected to terminal $I_S$. Transistor 42 is interconnected between terminal $V_O$ and the Zener diode 30 to act as an emitter follower. Likewise, transistor 44 is connected at its base to the base of transistor 42 to provide a parallel emitter follower output.

Transistor 46 is connected at its base to terminal $I_S$ and is interconnected with a transistor 48. Similarly, transistor 50 is interconnected in a Darlington configuration with transistor 52. Transistors 46–52 thus comprise a differential connected Darlington pair whose collectors are connected to feed a current mirror comprising transistors 54 and 56. The portion of the circuitry thus described is an operational amplifier which provides a reference voltage used to regulate the output of the oscillator in the manner to be subsequently described.

Transistor 58 is connected in a diode configuration and is connected across the operational amplifier in the manner shown in FIG. 1. Similarly, transistor 60 is connected in a diode configuration and is connected across terminal $I_S$ and $V_B$ and the input of operational amplifier, as also shown in FIG. 1.

A transistor 62 is connected at its emitter to terminal $V_B$ and at its collector to the base of a transistor 64. The emitter of transistor 64 is coupled with the base of transistor 62. A resistor 66 is connected across the base of transistor 62 and terminal $V_B$. A resistor 68 is connected across the base of transistor 64 and circuit ground of the integrated circuit substrate. Transistors 62 and 64, in combination with resistors 66 and 68, comprise the current source 24 previously shown in FIG. 1. The magnitude of the current source is the base-emitter voltage of transistor 62 divided by the resistance of a resistor 66.

The output of the current source is applied to the bases of transistors 70 and 72 which act as constant current sources and which are interconnected with transistors 74 and 76 to maintain the transistors 74 and 76 at the same current level. Transistor 74 is connected as a diode to compensate for the base-emitter offset of transistor 76. Transistor 74 is connected at its emitter to terminal A, while transistor 76 is connected through resistance 78 to the $V_B$ terminal. Transistors 80 and 82 are connected across circuit ground and the bases of transistors 70 and 72 in a diode configuration in order to stabilize the base voltage of the transistors. Emitter resistances 84 and 86 are connected to the emitters of transistors 70 and 72. Additional transistors 88 and 90 are connected at the bases thereof in parallel with transistor 72. Emitter resistances 92 and 94 are connected to transistors 88 and 90. The collector of transistor 88 is connected to the emitters of transistors 48 and 52. The collector of transistor 90 is connected to the emitter of transistor 44. The collector currents of transistors 88 and 90 are controlled to provide regulated current outputs for use in the circuit as illustrated.

Transistor 96 is connected at its base to the collector of transistor 76. The collector of transistor 96 is connected to the base of a transistor 98, the emitter of which is tied to the emitter of transistor 76. Transistors 96, 98 and 76 are connected as a compound Darlington or super beta group which acts as a differential amplifier. The inputs of the differential amplifier are the base of a transistor 100 and the emitter resistor 78 at the emitter of transistor 98.

The base of transistor 100 is tied through a resistance 102 to the emitter of the transistor, and is also tied to the collector and base of a transistor 104 connected in a diode configuration. The base of transistor 104 is tied to the base of transistor 106, and the transistors act as a current mirror with an input derived from the collector of transistor 98. The collector of transistor 106 is connected through a resistance 108 to the base of a transistor 110. The base of transistor 110 may be connected to an external capacitance 112, if desired. The base of transistor 110 is also connected to receive feedback via a lead 113, to be subsequently described. An input control signal is applied to transistor 110 from the collector of transistor 106. The collector of transistor 110 drives the base of a transistor 114 through a resistance 116. Transistor 114 is connected to circuit ground through an emitter resistor 118. A transistor 120 is connected across the base and emitter of transistor 114 and acts to limit the collector current of transistor 114.

In operation of the circuitry thus described, the low voltage from a battery source is applied to terminal $V_B$ and to the base of transistor 64. An emitter voltage is thus generated from transistor 64 and is sensed as voltage across resistance 66. When the voltage across resistance 66 exceeds the base-emitter voltage at transistor 62, transistor 62 conducts to limit the base drive to transistor 64. Thus, unregulated current is derived through resistor 68 and regulates the current through transistor 64 to a value proportional to the base-emitter voltage of transistor 62. An important aspect of the present invention is that transistors 62 and 64, in combination with resistances 66 and 68, have a negative temperature coefficient. The result is a regulated, but negative temperature compensated voltage output from the collector of transistor 64 which is applied to transistors 80 and 82 which operate as a parallel connected diode.

A reference voltage is thus set up across the transistors 80 and 82 which is proportional to the base emitter voltage of the transistors in order to provide a low impedance voltage source at a proper level to enable driving of the remaining transistors. This temperature compensated DC voltage is then applied to a plurality of parallel connected current sources comprising transistors 70, 72, 88 and 90 which have positive temperature coefficient characteristics. In accordance with the invention, the negative temperature coefficients of the transistors 62 and 64 are selected to approximately offset the positive temperature coefficients of the parallel connected current sources, such that the resulting current is essentially compensated for variations in temperature. Although it will be realized that the negative and positive temperature coefficients of the circuit may be varied in accordance with desired operating characterisitics, the positive temperature coefficients of the current sources which are offset according to the invention may comprise for example 0.1% per degree Centigrade of temperature increase.

The remainder of the circuitry comprises the preferred embodiment of the oscillator of the present invention and comprises a center tapped transformer 130 having a center tap connected via lead 132 to terminal $V_B$ of the integrated circuit. An output winding 131 is provided to apply the AC output to multiplier circuitry or the like.

Transistors 134 and 136 are connected at their emitters to opposite ends of the transformer winding 130. Transistors 134 and 136 are interconnected together at their bases and collectors to form diodes which operate to sense a preliminary feedback of the present oscillator which is generated via resistor 138 and lead 113 to the base of transistor 110.

A pair of transistors 140 and 142 are interconnected at the emitters thereof to one end of the transformer 130. Similarly, a second pair of transistors 144 and 146 are tied at their emitters to the opposite ends of the transformer winding 130. The collectors of transistors 142 and 144 are tied together and are applied to the collector of transistor 114. The collector of transistor 140 is connected to the base of a transistor 148. The collector of transistor 146 is tied to the base of transistor 150. The collector of transistor 148 is connected to one end of the transformer winding 130, while the collector of transistor 150 is connected to the other end of the transformer winding 130.

The frequency of oscillation of the present oscillator is determined by the resonance of the transformer winding, in addition to the component values of the oscillator elements. The oscillator, for example, may be used to generate an AC signal of from 25 to 35 KHz, but the circuit may be tuned to generate output AC signals ranging from 1 Hz to 1 MHz. The output amplitude of the oscillator is controlled by the collector current of transistor 114.

The oscillator operates to convert the regulated DC voltage generated by the current source circuitry previously described into a high voltage AC signal. The center tap transformer winding 130 is driven in accordance with the desired frequency and drives a high voltage multiplier which may comprise a diode string or the like in the well-known manner. The capacitor 112 which may be connected to the base of transistor 110 operates to filter the internal rectified feedback signal. The amplitude of the oscillator is thus controlled by the differential signal between terminal A and terminal $V_B$. Regulation of the oscillator may be accomplished in a first mode by applying representations of the output voltage at the oscillator to terminal $V_R$ which applies its signal to the base of transistor 28 and diode 30. Whenever the sensed voltage of the oscillator is above the breakdown voltage of the diode 30, the amplitude of the oscillator is consequently reduced. In the second mode, the oscillator amplitude may be controlled in response to current applied to terminal $I_S$.

In operation of the oscillator shown in FIG. 2, the transistors 140 and 142 serve as a first current mirror or sensor, while transistors 144 and 146 serve as a second current mirror or sensor. Drive current is applied in parallel to the current mirrors from the transistor 114. Whenever the voltage at point 160 of the transformer current winding is higher than the voltage at the other end point 162 of the transformer windings, then transistors 140 and 142 conduct and apply base drive to transistor 148. Furthermore, whenever the voltage at point 162 is higher than the voltage at point 160, transistors 144 and 146 conduct to apply base drive to transistor 150.

The transformer action of the circuit assures that if the potential at one end of the transformer winding is lower than the voltage applied to terminal $V_B$, the voltage at the other end of the transformer winding will be higher. Thus, the resonance of the transformer ringing causes the oscillation to be sustanied and the transistors 148 and 150 are alternatively rendered conductive. Transistors 134 and 136 operate as a full wave rectifier to generate feedback which is applied through resistor 138 to the base of transistor 110. This provides controlled gain to stabilize the overall circuit.

It will thus be seen that the present oscillator requires only two power transistors 148 and 150 connected in a push-pull configuration to the transformer winding 130. The oscillator further requires only two transistor voltage controlled switches or mirrors 140–142 and 144–146 to alternately direct current to the two power transistors in accordance with a predetermined polarity at the ends of the transformer winding. In accordance with this construction, extremely high power transistors are not required to be utilized, thereby enabling the present oscillators to be formed on integrated circuitry by eliminating the requirement of external discrete power transistors and discrete components.

Figure 3:
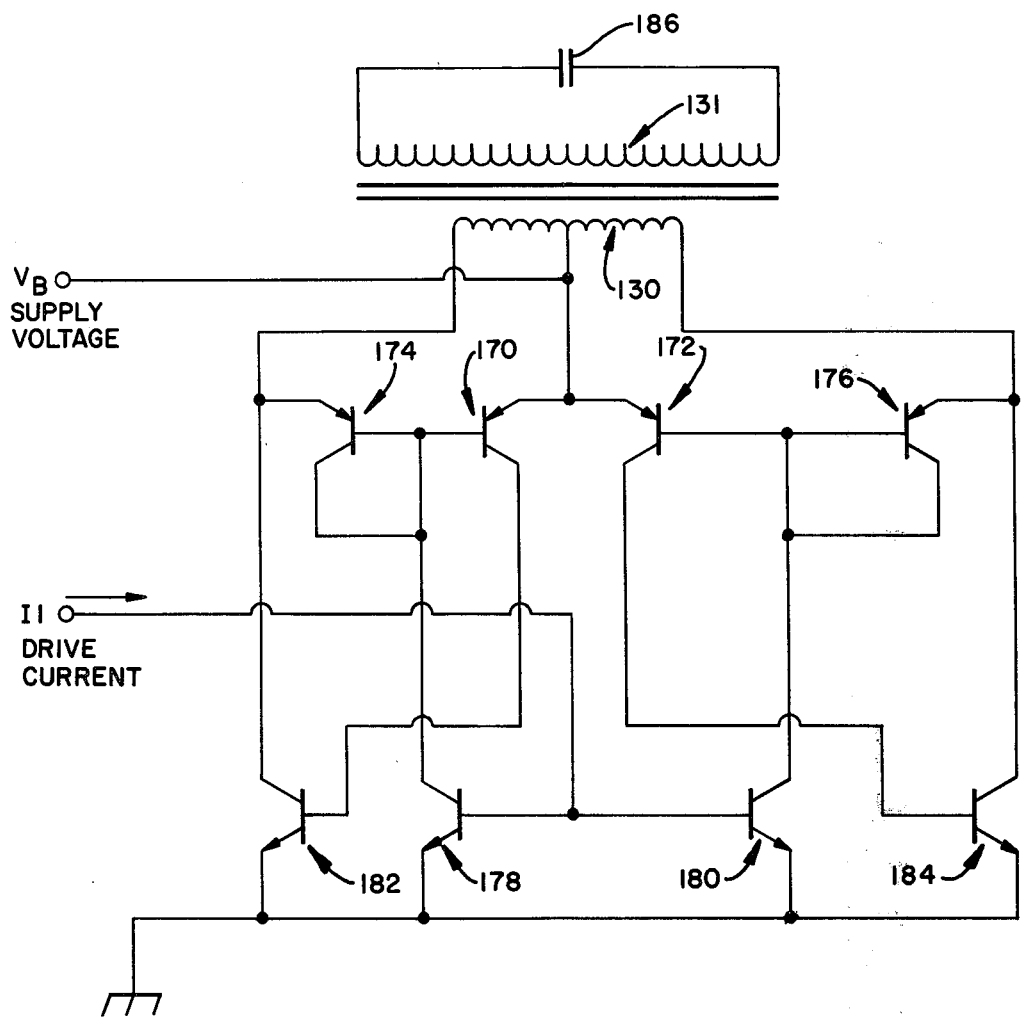
FIG. 3 is a schematic diagram of another embodiment of the oscillator in accordance with the invention.

FIG. 3 illustrates another configuration of an oscillator in accordance with the present invention. Supply voltage $V_B$ is applied to the center tap of the transformer winding 130. The emitters of transistors 170 and 172 are tied together and are tied to the center tap of the transformer winding 130. A transistor 174 is connected at its emitter to one end of the transformer winding 130 and at its base to the base of transistor 170. Transistor 174 is tied at its base and collector to act as a diode. Similarly, transistor 176 is tied at its emitter to the opposite end of the transformer winding 130 and its base and collector are tied in a diode configuration to the base of transistor 172.

Drive current from transistor 114 in the circuit shown in FIG. 2 is applied to the bases of transistors 178 and 180 which are connected at their collectors to the bases of transistors 170 and 172, respectively. Transistors 182 and 184 are connected at their collectors to opposite sides of the transformer winding 130 and at their emitters to circuit ground. The base of transistor 182 is tied to the collector of transistor 170. The base of transistor 184 is tied to the collector of transistor 172. A resonant capacitance 186 is connected across the transformer winding 131.

In operation of the oscillator circuit shown in FIG. 3, it will be seen that a relatively large number of transistors are utilized to eliminate the need for any discrete component capacitors and high power transistors. As in the preferred embodiment, the present circuit eliminates high peak currents by driving alternate sides of the transformer winding center tap with a steady DC current which is commutated by detecting which side of the transformer winding is at the lowest potential and by directing the drive current to that side while turning off current to the opposing side of the transformer winding. Oscillation is started from the traditional stability point (zero volts across the transformer) by inherent noise and imperfect symmetry of the circuit elements. Thereafter, oscillation is maintained by the transfer of a portion of the input energy back and forth between the resonant capacitance 186 and the inductance of the transformer secndary circuitry.

Transistors 178 and 180 share the drive current at their bases and provide separate collector currents which are essentially independent of their respective collector voltages. The transformer action of the transformer winding forces the voltage difference from the transformer center tap to the emitter of transistor 174 to be of equal magnitude, but opposite polarity of that from the center tap to the emitter of transistor 176. Therefore, if it is assumed that the emitter of transistor 174 is momentarily positive with respect to the center tap voltage, it is evident that the collector current through transistor 178 flows through transistor 174 and prevents transistor 170 from conducting collector current.

At the same time, the collector current of transistor 180 flows in the base of transistor 172, since the emitter of transistor 176 is negative with respect to the center tap voltage of the transformer winding, and since the diode configuration 176 is cut off. The base current into transistor 172 causes a magnified collector current to flow from transistor 172 into the base of transistor 184, thereby causing collector current from transistor 184 to drive its side of the transformer primary winding. The current which flows is limited by the current gains of the various transistors and by the amount of drive current, and therefore cannot hold the voltage at that end of the transformer winding lower than the voltage at the center tap indefinitely, because of the finite inductance of the power transformer primary. Thus, when the voltage across the transformer "rings" back to the opposite polarity, the same action takes place as described above, except that it occurs on opposite sides of the circuit.

The present circuits are especially adapted to integrated circuit construction because the required degree of matching opposite side components is easily obtainable and because the relatively large number of transistors is not then a disadvantage in an integrated circuit configuration. The present circuits feature high current gain from the drive current input to the output AC current and can be regulated by feedback circuitry to control amplitude of the output over a wide range.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An oscillator comprising:
   a resonant transformer including primary and secondary windings each having first and second terminals;
   first and second power transistors each having base, emitter and collector electrodes, said first and second power transistor emitter and collector electrodes being connected in a push-pull configuration, such that said first power transistor collector electrode is connected to said primary winding first terminal and said second power transistor collector electrode is connected to said primary winding second terminal;
   circuit means for applying current to said power transistors; and
   at least one voltage controlled switch interconnected across said primary winding for alternately directing current from said circuit means to one of said power transistors in accordance with a predetermined polarity at said primary winding terminals.

2. The oscillator of claim 1 and further including:
   a center tap on said transformer primary winding; and
   means for applying DC current to said center tap.

3. The oscillator of claim 1 wherein said voltage controlled switch comprises:
   at least one transistor having emitter electrodes being interconnected to said primary winding and at least one transistor having collector electrodes being interconnected to said circuit means for receiving said current and wherein the bases of said transistors are interconnected to each other.

4. The oscillator of claim 3 and further including:
   rectifier means connected across said primary winding of said resonant transformer for generating a feedback signal to said circuit means for controlling the gain of said circuit means.

5. The oscillator of claim 2 and further including:
   first and second transistors each having base, emitter and collector electrodes, said base electrodes being interconnected to said circuit means for receiving said current;
   a first diode having first and second electrodes, said first electrode being connected to said primary winding first terminal and said second electrode being connected to said collector electrode of said first transistor;
   a second diode having first and second electrodes, said first electrode being connected to said primary winding second terminal and said second electrode being connected to said collector electrode of said second transistor;
   a third transistor having base, emitter and collector electrodes, said emitter electrode being connected to said center tap, said base electrode being connected to said second electrode of said first diode and said collector electrode being connected to said base electrode of said first power transistor; and
   a fourth transistor having base, emitter and collector electrodes, said emitter electrode being connected to said center tap, said base electrode being connected to said second electrode of said second diode and said collector electrode being connected to said base electrode of said second power transistor.

6. An oscillator comprising:
   a resonant transformer including primary and secondary windings each having first and second terminals;
   first and second power transistors each having base, emitter and collecter electrodes, said collector electrode of said first power transistor being connected to said first terminal of said primary winding, said collector electrode of said second power transistor being connected to said second terminal of said primary winding and said emitter electrodes of said power transistors being connected to circuit ground;
   first and second voltage detector circuits connected across said primary winding and each having a first terminal for receiving drive current and a second terminal for connection to said base electrode of one of said power transistors; and
   said voltage detector circuits operable to render one of said power transistors conductive according to the terminal of said primary winding having a higher voltage potential, wherein the oscillator oscillates to generate a predetermined frequency signal at said secondary winding of said resonant transformer.

7. The oscillator of claim 6 and further including:
   a center tap on said transformer primary winding; and
   means for applying DC current to said center tap.

8. The oscillator of claim 6 and further including:
   circuit means for applying current to said power transistors; and
   rectifier means connected across said primary winding of said resonant transformer for generating a feedback signal to said circuit means for controlling the gain of said circuit means.

9. The oscillator of claim 6 wherein said power transistors and said voltage detector circuits are wholly constructed on an integrated circuit chip without the requirement of external components.

10. The oscillator of claim 6 wherein each of said voltage detector circuits includes:

a first transistor having base, emitter and collector electrodes, said emitter electrode connected to one terminal of said primary winding, and said collector electrode connected to one of said base electrodes of said power transistors; and a second transistor having base, emitter and collector electrodes, said base and collector electrodes connected to said base electrode of said first transistor to receive drive current and said emitter electrode connected to one terminal of said primary winding.

11. An oscillator for fabrication on an integrated circuit chip comprising:

a resonant transformer for connection to the chip, said resonant transformer including primary and secondary windings each having first and second terminals and wherein said primary winding includes a center tap;

means for applying a voltage to said center tap;

first and second power transistors each having base, emitter and collector electrodes, said first and second power transistor emitter and collector electrodes being connected in a push-pull configuration, such that said first power transistor collector electrode is connected to said primary winding first terminal and said second power transistor collector electrode is connected to said primary winding second terminal and said emitter electrodes being connected to circuit ground;

first and second transistors each having base, emitter and collector electrodes, said base electrodes commonly connected to receive regulated current dirve, said collector electrodes connected across said primary winding and said emitter electrodes connected to circuit ground; and third and fourth transistors each having base, emitter and collector electrodes, said base electrodes connected across said primary winding, said emitter electrodes commonly connected to said center tap and one of said collector electrodes connected to one of said base electrodes of said first and second transistors, such that said first, second, third and fourth transistors are operable to render alternate ones of said power transistors conductive depending upon which terminal of said primary winding is at a higher voltage potential.

12. The oscillator of claim 11 and further including:

a first diode having first and second electrodes, said first electrode being connected to said primary winding first terminal and to said collector electrode of said first power transistor, said second electrode being connected to said base electrode of said third transistor and to said collector electrode of said first transistor; and a second diode having first and second electrodes, said first electrode being connected to said primary winding second terminal and to said collector electrode of said second power transistor, said second electrode being connected to said base electrode of said fourth transistor and to said collector electrode of said second transistor.

* * * * *